United States Patent
Batra et al.

(10) Patent No.: US 9,660,751 B2
(45) Date of Patent: May 23, 2017

(54) WIRELESS COMMUNICATION SYSTEM WITH EFFICIENT PDCCH PROCESSING

(71) Applicants: Sanjay Batra, Noida (IN); Atul Kumar, Kalkaji (IN)

(72) Inventors: Sanjay Batra, Noida (IN); Atul Kumar, Kalkaji (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 228 days.

(21) Appl. No.: 14/623,515

(22) Filed: Feb. 17, 2015

(65) Prior Publication Data
US 2016/0242149 A1 Aug. 18, 2016

(51) Int. Cl.
*H04J 13/16* (2011.01)
*H04W 72/00* (2009.01)
*H04W 12/02* (2009.01)

(52) U.S. Cl.
CPC ............ *H04J 13/16* (2013.01); *H04W 12/02* (2013.01); *H04W 72/00* (2013.01)

(58) Field of Classification Search
CPC ...... H04W 72/04; H04W 88/08; H04W 76/00
See application file for complete search history.

(56) References Cited

U.S. PATENT DOCUMENTS

| 8,583,128 B2 | 11/2013 | Choi et al. | |
| 2007/0070934 A1* | 3/2007 | van Rooyen | H04B 1/0064 370/328 |
| 2011/0194524 A1* | 8/2011 | Hedlund | H04L 5/0053 370/329 |
| 2011/0310817 A1* | 12/2011 | Okubo | H04L 5/0003 370/329 |
| 2012/0327864 A1 | 12/2012 | Gazit | |
| 2013/0182782 A1 | 7/2013 | Gazit et al. | |
| 2013/0223482 A1 | 8/2013 | Pourahmadi | |
| 2013/0242904 A1* | 9/2013 | Sartori | H04L 5/0053 370/329 |
| 2014/0071935 A1* | 3/2014 | Papasakellariou | H04L 5/0053 370/330 |
| 2014/0321368 A1* | 10/2014 | Ivanov | H04L 5/0058 370/329 |
| 2015/0036513 A1* | 2/2015 | Bukin | H04L 43/12 370/250 |
| 2016/0037440 A1* | 2/2016 | Zhang | H04W 48/16 455/434 |

* cited by examiner

*Primary Examiner* — Siren Wei
(74) *Attorney, Agent, or Firm* — Charles E. Bergere

(57) ABSTRACT

A wireless communication system includes a processor that receives a downlink control information (DCI) associated with a transmission channel used for transmitting a RF signal and a control channel element index associated with the DCI. The processor determines a scrambling code based on the control channel element index for the DCI, scrambles the DCI using the scrambling code, generates a scrambled DCI, and modulates the scrambled. DCI to generate a modulated symbol. The processor uses look-up tables to determine a resource element group (REG) based on the control channel element index, map the modulated symbol to the REG, and generate a transmission frame.

16 Claims, 5 Drawing Sheets

WIRELESS COMMUNICATION SYSTEM WITH EFFICIENT PDCCH PROCESSING

BACKGROUND

The present invention relates generally to wireless communication systems, and, more particularly, to physical downlink control channel processing in a wireless communication network.

A wireless communication system includes a base station and multiple user equipment devices (UEs). The UEs include both fixed and portable devices such as cellular phones, personal digital assistants (PDAs), and fixed terminals such as landline telephones and work stations that use wireless modem cards.

The base stations are base transceiver systems (BTS) that communicate with the UEs using radio-frequency (RF) signals that conform to specific standards and technologies, like long term evolution (LTE), high speed packet access (HSPA), and third generation partnership project (3GPP) standards. Each RF signal includes multiple transmission frames and each transmission frame includes multiple subframes. Each subframe further includes multiple orthogonal frequency-division multiplexing (OFDM) symbols. For example, each subframe may include two slots, where each slot further includes 7 OFDM symbols for normal cyclic prefix. Further, each subframe corresponds to 1 transmission time interval (TTI), where TTI refers to a time required by the base station for transmitting a subframe to the UE.

Based on the number of UEs in a wireless communication network and coverage area, the wireless communication network is categorized as a macro, micro, or small cell. A macro cell caters to a large number of UEs that operate in environments requiring a large coverage area such as offices and shopping centers. Small cells include pico and femto cells. A small cell caters to fewer UEs that operate a small coverage area such as a home.

A communication from the base station to the UE is referred to as downlink communication and a transmission channel used for the downlink communication is referred to as a downlink transmission channel. A communication from the UE to the base station is referred to as uplink communication and a transmission channel used for the uplink communication is referred to as an uplink transmission channel. Thus, the transmission channel includes both the downlink and uplink transmission channels, and hence, is bi-directional. The downlink transmission channel includes multiple downlink control channels that are used by the base station to configure the UEs and a physical downlink shared channel (PDSCH) that is used by the base station to transmit data to the UEs. For example, the downlink control channels may include a physical downlink control channel (PDCCH), a physical control format indicator channel (PCFICH), and a physical hybrid automatic-repeat-request indicator channel (PHICH).

During downlink communication, the base station uses the PDCCH to send control bits to a UE. The control bits include information indicative of the PDCCH and the PDSCH. Since the wireless communication network includes multiple UEs that communicate with at least one base station, the base station multiplexes the UEs in time and frequency domains on a transmission frame. The transmission frame includes multiple resource blocks (RBs) that are indicative of resources allocated to the UEs for the downlink transmission. Each RB includes multiple resource elements that are mapped to data frames to be transmitted to the UEs, and hence, RBs are associated with the data frames to be transmitted to the UEs. Thus, the base station associates the RBs with the UEs to schedule transmission of the downlink user data from the base station on the transmission frame. The base station further communicates the resource allocations to the UEs using the control bits on the PDCCH. Thus, the control bits also include information indicative of the resources allocated to the UE on a corresponding transmission channel. The control bits transmitted through the PDCCH are referred to as downlink control information (DCI).

The base station includes a power architecture system, a digital signal processing (DSP) sub-system, and a hardware accelerator. The power architecture system includes a Layer 2 (L2) processor that generates multiple DCI payloads corresponding to the multiple UEs, where each DCI payload includes a DCI corresponding to a UP. Thus, each DCI payload is user-specific and corresponds to a PDCCH corresponding to the UP. The DSP sub-system includes a Layer 1 (L1) processor. The L1 processor receives the multiple DCI payloads from the L2 processor, generates a transmission frame based on the multiple user specific DCI payloads using conventional PDCCH processing techniques, and then provides the transmission frame to the hardware accelerator for subsequent transmission.

The L1 processor processes the DCI payloads by appending a cyclic redundancy check (CRC) at the termination of each DCI payload. Subsequently, the L1 processor codes each DCI payload and executes a rate-matching algorithm to generate rate-matched coded DCI bits corresponding to each DCI payload. The rate-matched coded DCI bits corresponding to each DCI payload are also referred to as RDCI payloads or code-words.

The L1 processor multiplexes and stores the RDCI payloads for each UN in a double-data rate (DDR) buffer based on a plurality of control channel element indices (also referred to as "cceidx") corresponding to the DCI payloads. The multiplexing of the RDCI payloads is performed by executing PDCCH multiplexing algorithm. However, during PDCCH multiplexing, unoccupied memory blocks are generated between consecutive RDCI payloads in the DDR buffer. Such unoccupied memory blocks are referred to as NIL elements. Thus, NIL elements are inserted between the multiplexed RDCI payloads in the DDR buffer.

The L1 processor executes a scrambling algorithm to utilize a scrambling sequence received from a scrambling sequence generator and scramble the entire DDR buffer. Thus, the multiplexed RDCI payloads and the NIL elements are scrambled to generate scrambled RDCI payloads and scrambled NIL elements. The scrambled RDCI payloads are referred to as SDCI payloads and scrambled NIL elements are referred to as SNIL elements.

After scrambling, quadrature phase shift keying (QPSK) modulation is used to modulate the SDCI payloads and the SNIL elements to generate modulated symbols. The modulated symbols are stored in the DDR buffer and a power boosting operation is performed on the DDR buffer.

The L1 processor executes a layer-mapping and pre-coding algorithm after the QPSK modulation to map the modulated symbols stored in the DDR buffer to antenna ports. For example, if the base station includes two antennas, the modulated symbols are divided in to first and second sets of modulated symbols. After layer-mapping and pre-coding, the L1 processor stores the first and second sets of modulated symbols in first and second temporary DDR buffers, respectively.

Next the L1 processor executes an interleaving algorithm. The L1 processor discards the modulated symbols corresponding to the SNIL elements and performs an interleaving operation on the modulated symbols corresponding to the SDCI payloads stored in the first and second temporary DDR buffers. Thus, the additional machine cycles used by the L1 processor to scramble the NIL elements, modulate the SNIL elements, layer-mapping, and pre-coding the modulated symbols corresponding to the SNIL elements are unnecessary, and increase the processing time required by the L1 processor to perform the PDCCH processing and generate the transmission frame.

The L1 processor maps the interleaved modulated symbols corresponding to the SDCI payloads to the resource element group (REG) and generates first and second sets of mapped modulated symbols by executing an REG mapping algorithm. The SDCI payloads are stored in the interleaved first and second temporary DDR buffers. The L1 processor then stores the first and second sets of mapped modulated symbols in first and second antenna buffers, respectively, for transmission.

A large number of machine cycles are consumed for interleaving and REG mapping. The L1 processor performs the interleaving operation on the modulated symbols based on interleaved locations. For REG mapping, the L1 processor processes the interleaved locations using a cyclic shifting operation to generate sequential indices. The L1 processor further stores a lookup table (LUT) having a mapping between the sequential indices and REG locations in internal memory. The L1 Processor uses the LUT to fetch a REG location based on a sequential index corresponding to a modulated symbol. Since, interleaving and REG mapping are performed independently, the L1 processor requires an excessive number of machine cycles, which increases the PDCCH processing time.

The PDCCH processing requires the L1 processor to process the DDR buffer as well as the first and second temporary DDR buffers. Therefore, the L1 processor uses many processing cycles due to the immense amount of time required to load data from the DDR buffer and store the data in the DDR buffer. The conventional PDCCH processing techniques are not cache efficient and use a lot of memory. For example, even if the DDR buffer includes only a single DCI, the L1 processor still processes the entire DDR buffer. Thus, regardless of the number of users in the wireless communication network and the size of the DCI payload, the L1 processor requires the same number of machine cycles to process the DDR buffer.

The PDCCH multiplexing algorithm does not permit the conventional PDCCH processing technique to be offloaded to multiple cores. Further, the complexity of the conventional PDCCH processing technique prevents the utilization of less complex modules such as hardware accelerators for the DCI processing.

The 3GPP standard (release-8) that corresponds to LTE provides support for 15 megahertz (MHz) and 20 MHz bandwidth. Conventionally, each TTI caters to a single user. Due to increasing numbers of UEs in small and macro cells, the base station must cater to multiple users for each TTI. For example, for the base station to cater to 64 users, it must provide support to at least 4 users per TTI. However, because conventional PDCCH processing takes so long, the base station cannot support multiple users for each TTI at higher bandwidth.

Therefore, it would be advantageous to have a wireless communication system with more efficient PDCCH processing such that it can support multiple users for each TTI.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
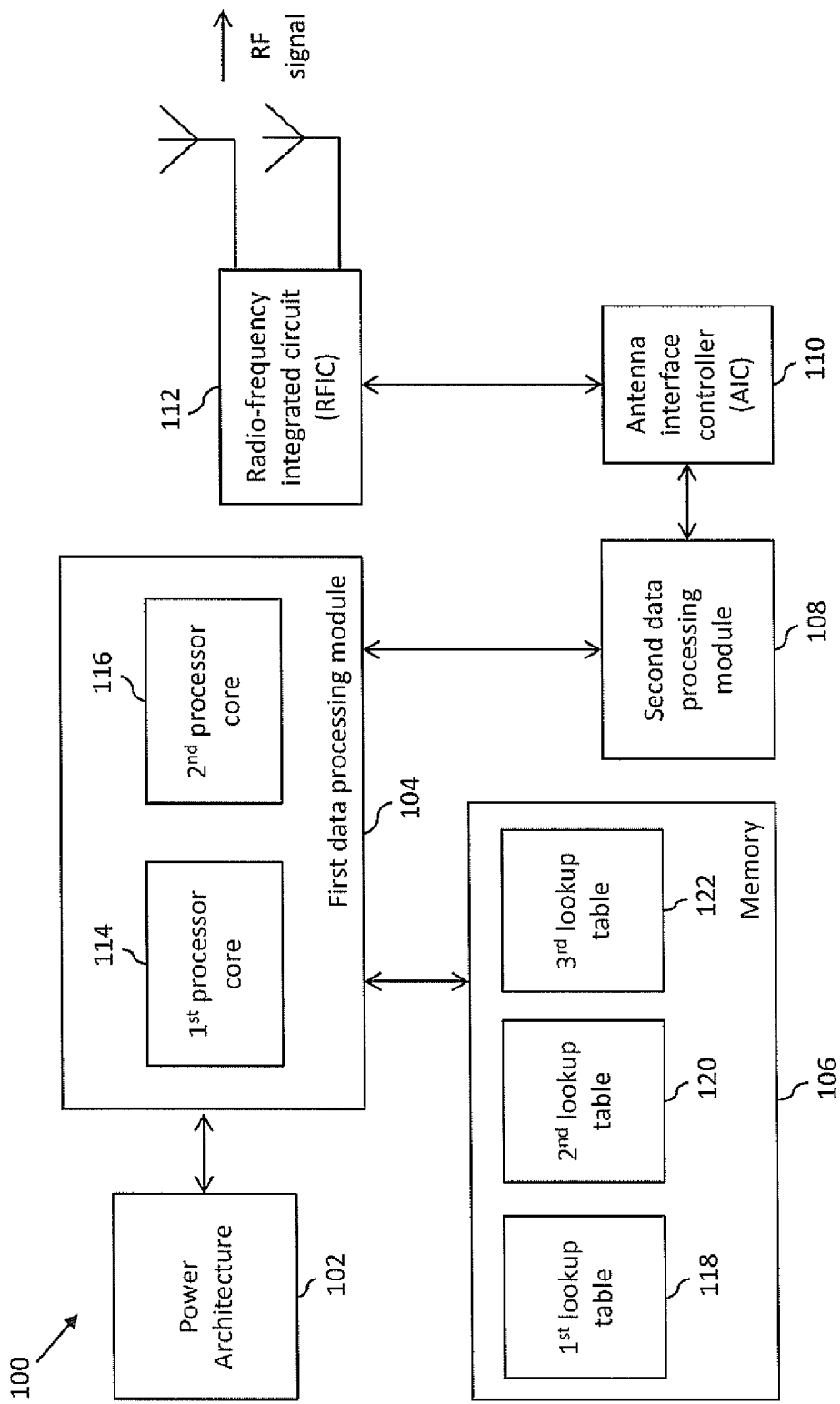
FIG. 1 is a schematic block diagram of a wireless communication system in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a processor for generating a transmission frame of a radio-frequency (RF) signal in a wireless communication system is provided. The processor receives downlink control information associated with a transmission channel used for transmitting the RF signal and a control channel element index associated with the downlink control information. The processor determines a scrambling code based on the control channel element index, generates a scrambled downlink control information based on the scrambling code, modulates the scrambled downlink control information for generating a modulated symbol, determines a resource element group based on the control channel element index, and maps the modulated symbol to the resource element group for generating the transmission frame.

In another embodiment of the present invention, a wireless communication system is provided. The wireless communication system includes a power controller, a processor, a hardware accelerator, an antenna interface controller, and a radio frequency integrated circuit (RFIC). The power controller generates downlink control information associated with a transmission channel used for transmitting a radio-frequency (RF) signal and a control channel element index associated with the downlink control information. The processor receives the downlink control information and the control channel element index, determines a scrambling code based on the control channel element index, generates a scrambled downlink control information based on the scrambling code, modulates the scrambled downlink control information for generating a modulated symbol, determines a resource element group based on the control channel element index, and maps the modulated symbol to the resource element group for generating a transmission frame. The hardware accelerator receives the transmission frame and converts the transmission frame from the frequency domain to the time domain. The antenna interface controller receives the transmission frame and generates RF digital data based on the transmission frame. The RFIC receives the RF digital data, generates the RF signal based on the RF digital data, and transmits the RF signal by way of an antenna port.

In yet another embodiment of the present invention, a method for generating and transmitting a transmission frame of a radio-frequency (RF) signal by a wireless communication system is provided. The wireless communication system includes a hardware accelerator. The method includes receiving downlink control information associated with a transmission channel used for transmitting the RF signal and a control channel element index associated with the downlink control information. A scrambling code for the downlink control information based on the control channel element index is fetched from a first lookup table. Scrambled downlink control information is generated using the scrambling code. The scrambled downlink control information is modulated for generating a modulated symbol. A resource element group is determined based on the control channel element index. The modulated symbol is mapped to the resource element group to generate the transmission frame, which then is transmitted by the hardware accelerator.

Various embodiments of the present invention provide a wireless communication system for physical downlink control channel (PDCCH) processing. The wireless communication system includes a processor and a memory for storing first through third lookup tables. The processor receives downlink control information associated with a transmission channel used for transmitting a radio-frequency (RF) signal and a control channel element index associated with the downlink control information. The processor fetches a scrambling code based on the control channel element index from the first lookup table, generates scrambled downlink control information based on the scrambling code, and modulates the scrambled downlink control information for generating a modulated symbol. Thus, the processor does not generate nor process NIL elements. Thus, a multicore processor can be used for parallel processing, where each core processor processes different downlink control information.

The processor fetches a sequential index of a plurality of sequential indices from the second lookup table based on the control channel element index and an interleave index of a plurality of interleave indices that corresponds to the modulated symbol. Subsequently, the processor fetches a mapping address of a plurality of mapping addresses from the third lookup table based on the sequential index. The modulated symbol is mapped to a resource element group (REG) based on the mapping address to generate a transmission frame. The mapping of the modulated symbol is performed using a modified quadruplet interleaving algorithm. The modified quadruplet interleaving algorithm is a low-complexity algorithm and hence, requires fewer machine cycles than used in conventional PDCCH processing and can be performed by a hardware accelerator. Since the time required for the PDCCH processing depends on the number of active users, the processing time consumed by the processor is reduced. Moreover, due to reduced processing time, support of multiple users is enabled for each transmission time interval (TTI).

Referring now to FIG. 1, a schematic block diagram of a wireless communication system 100 is provided. The wireless communication system 100 is used for physical downlink control channel (PDCCH) processing in a wireless communication network that includes multiple user equipment (UEs). The wireless communication system 100 is a base station and services the UEs. The wireless communication system 100 includes a power controller 102, a first data processor 104, a memory 106, a second data processor 108, an antenna interface controller (AIC) 110, and a radio-frequency integrated circuit (RFIC) 112.

The power controller 102 includes layer two (L2) and layer three (L3) processing modules (not shown). The L3 processing module includes a radio resource control (RRC) layer. The L2 processing module (also referred to as L2 protocol stack) includes a packet data convergence protocol (PDCP) layer, a radio link control (RLC) layer, and a medium access control (MAC) layer. The MAC layer generates multiple downlink control information (DCI) payloads corresponding to multiple PDCCHs. The MAC layer further associates control channel element indices with the DCI payloads. Each DCI payload and its corresponding control channel element index are utilized by the first data processor 104 for PDCCH processing. The power controller 102 provides the DCI payloads and the control channel element indices to the first data processor 104.

The first data processor 104 is connected to the power controller 102 for receiving the DCI payloads and the control channel element indices. In an embodiment of the present invention, the first data processor 104 is a single-core processor. In another embodiment of the present invention, the first data processor 104 is a multicore processor and hence, includes first and second processing cores 114 and 116.

The first data processor 104 processes the DCI payloads by appending a cyclic redundancy check (CRC) at the termination of each DCI payload. Subsequently, the first data processor 104 codes each DCI payload and executes a rate-matching algorithm to generate rate-matched coded DCI bits corresponding to each DCI payload. The rate-matched coded DCI bits corresponding to each DCI payload are also referred to as RDCI payloads. The RDCI payloads are en-queued for subsequent sequential processing of the RDCI payloads and generation of a transmission frame.

The transmission frame comprises a resource grid that includes multiple mapping addresses corresponding to multiple resource element groups (REGs). Each REG includes multiple resource elements and the multiple resource elements correspond to at least one of a plurality of subcarriers of a radio frequency (RF) signal and a plurality of orthogonal frequency division multiplexing (OFDM) symbols of the RF signal. In an embodiment of the present invention, the first data processor 104 en-queues the RDCI payloads in a queue memory (not shown).

Figure 2:
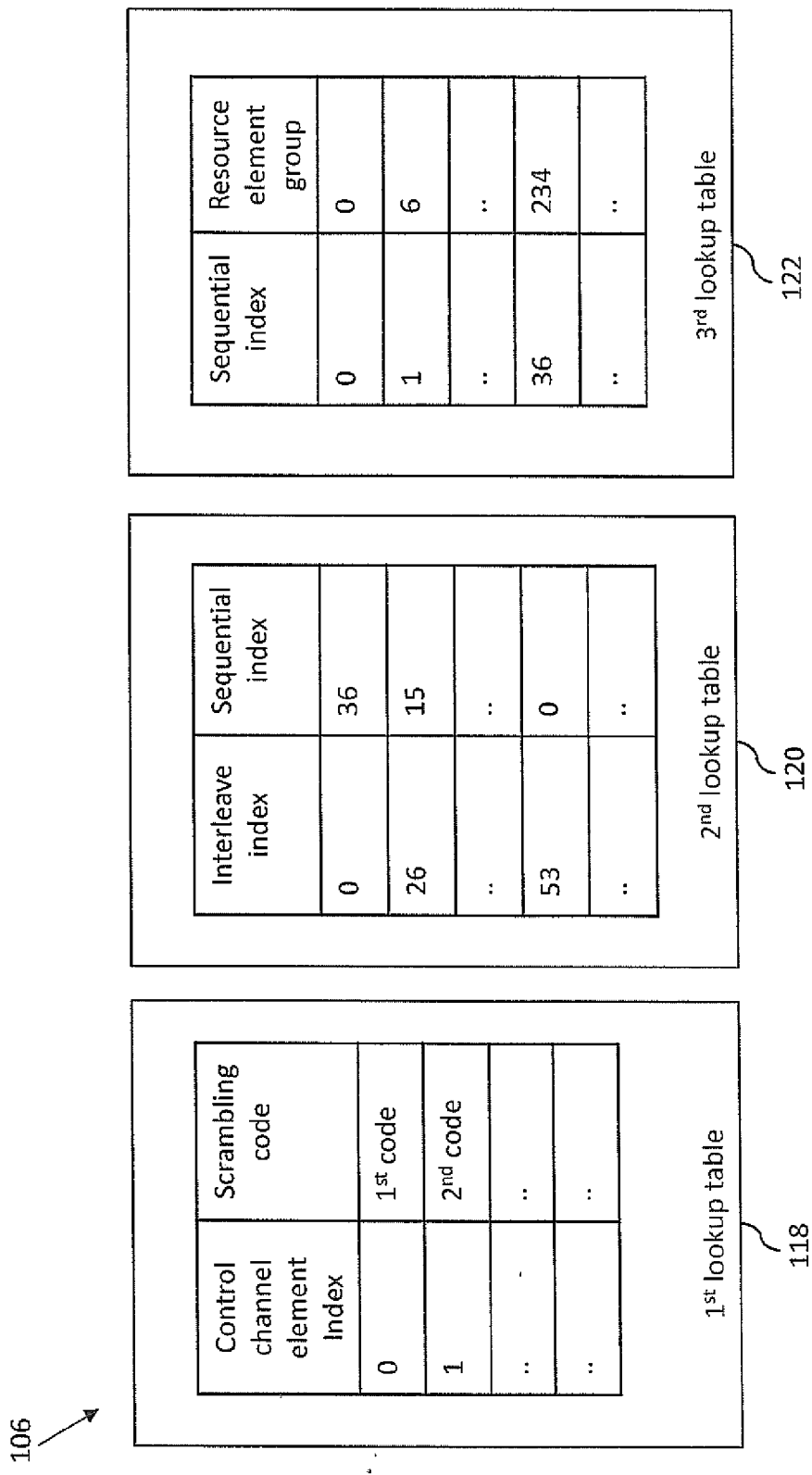
FIG. 2 is a schematic block diagram of a memory of the wireless communication system of FIG. 1 in accordance with an embodiment of the present invention.

FIG. 2 is a schematic block diagram of the memory 106 of the wireless communication system 100 in accordance with an embodiment of the present invention. The memory 106 includes first through third lookup tables 118-122. The first lookup table 118 is used to store a mapping between the control channel element indices and corresponding scrambling codes. The scrambling codes form a scrambling sequence. The second lookup table 120 is used to store a mapping between interleave indices and corresponding sequential indices. The third lookup table 122 is used to store a mapping between the sequential indices and a corresponding plurality of mapping addresses. In an embodiment of the present invention, the first data processor 104 configures the first through third lookup tables 118-122.

After executing the rate-matching algorithm, the first data processor 104 executes a modified scrambling algorithm by fetching the scrambling codes from the first lookup table 118 based on the control channel element indices and scrambles the RDCI payloads to generate scrambled RDCI payloads (also referred to as SDCI payloads). For example, the first data processor 104 de-queues a first RDCI payload from the queue memory. Subsequently, the first data processor 104 fetches a first scrambling code from the first lookup table 118 based on a first control channel element index corresponding to the first RDCI payload and scrambles the first RDCI payload with the first scrambling code to generate a first SDCI payload.

After execution of the modified scrambling algorithm, the first data processor 104 modulates the first SDCI payload using Quadrature Phase Shift Keying (QPSK) modulation and generates a first modulated symbol. The first modulated symbol includes a plurality of in-phase and quadrature-phase (I/Q) symbols. The first data processor 104 executes a layer-mapping and pre-coding algorithm to map the first modulated symbol to an antenna port. For example, if the wireless communication system 100 is connected to first and second antennas, after layer-mapping and pre-coding, the modulated symbols are categorized as first and second sets of modulated symbols.

Similarly, the first data processor 104 de-queues a second RDCI payload from the queue memory, fetches a second scrambling code from the first lookup table 118 based on a second control channel element index of the second RDCI payload, and generates a second SDCI payload. Subsequently, the first data processor 104 generates a second modulated symbol corresponding to the second SDCI payload. Thus, the first data processor 104 generates modulated symbols corresponding to the SDCI payloads. The first data processor 104 then performs the layer-mapping and pre-coding algorithm for the second modulated symbol. For example, the first. RDCI payload may include multiple bytes of data, so the first data processor 104 fetches a first byte of the first RDCI payload and a first byte of the corresponding first scrambling code based on the first control channel element index and generates a first byte of the first. SDCI payload. The first data processor 104 modulates the first byte of the first SDCI payload to generate the first modulated symbol. The first modulated symbol may include 4 QPSK symbols and hence, may also be referred to as a quadruplet.

In another example, if the first data processor 104 is a multicore processor, the first and second processing cores 114 and 116 receive first and second DCI payloads and the corresponding first and second control channel element indices, respectively. After execution of the modified scrambling algorithm, the first and second processing cores 114 and 116 generate the first and second modulated symbols, respectively. Thus, the first data processor 104 can offload the processing of the DCI payloads from a single processing core to the first and second processing cores 114 and 116 when the wireless communication network includes multiple UEs and hence, multiple users, thereby reducing the time required for the PDCCH processing of the DCI payloads. Hence, the first data processor 104 enables utilization of the multicore processor for parallel PDCCH processing of the DCI payloads.

Thus, the first data processor 104 does not multiplex the RDCI payloads prior to execution of the modified scrambling algorithm and storage of the multiplexed RDCI payloads in (DDR) memory (not shown). Instead, the first data processor 104 queues the RDCI payloads for independent processing. Therefore, NIL elements are not generated and hence PDCCH multiplexing of the DCI payloads and generation and processing of NIL elements is not performed. Since NIL elements are not generated, the first data processor 104 performs the PDCCH processing of the DCI payloads of active UEs in the wireless communication network, and hence, consumes machine cycles proportionate to the number of active users in the wireless communication network. Therefore, the first data processor 104 requires fewer machine cycles for the PDCCH processing in small cells such as pica and femto cells, which cater to fewer UEs.

The modified scrambling algorithm avoids the repetitive processing of a DDR buffer or temporary DDR buffers. Further, the first data processor 104 does not require temporary memory for storing the RDCI payloads, the SDCI payloads, and the modulated symbols. Instead, the first data processor 104 utilizes variables stored in a stack memory (not shown) to perform the PDCCH processing and hence, improves data cache locality, which enables further reduction in the number of machine cycles required for PDCCH processing. Therefore, the number of machine cycles required for PDCCH processing is reduced.

Figure 3:
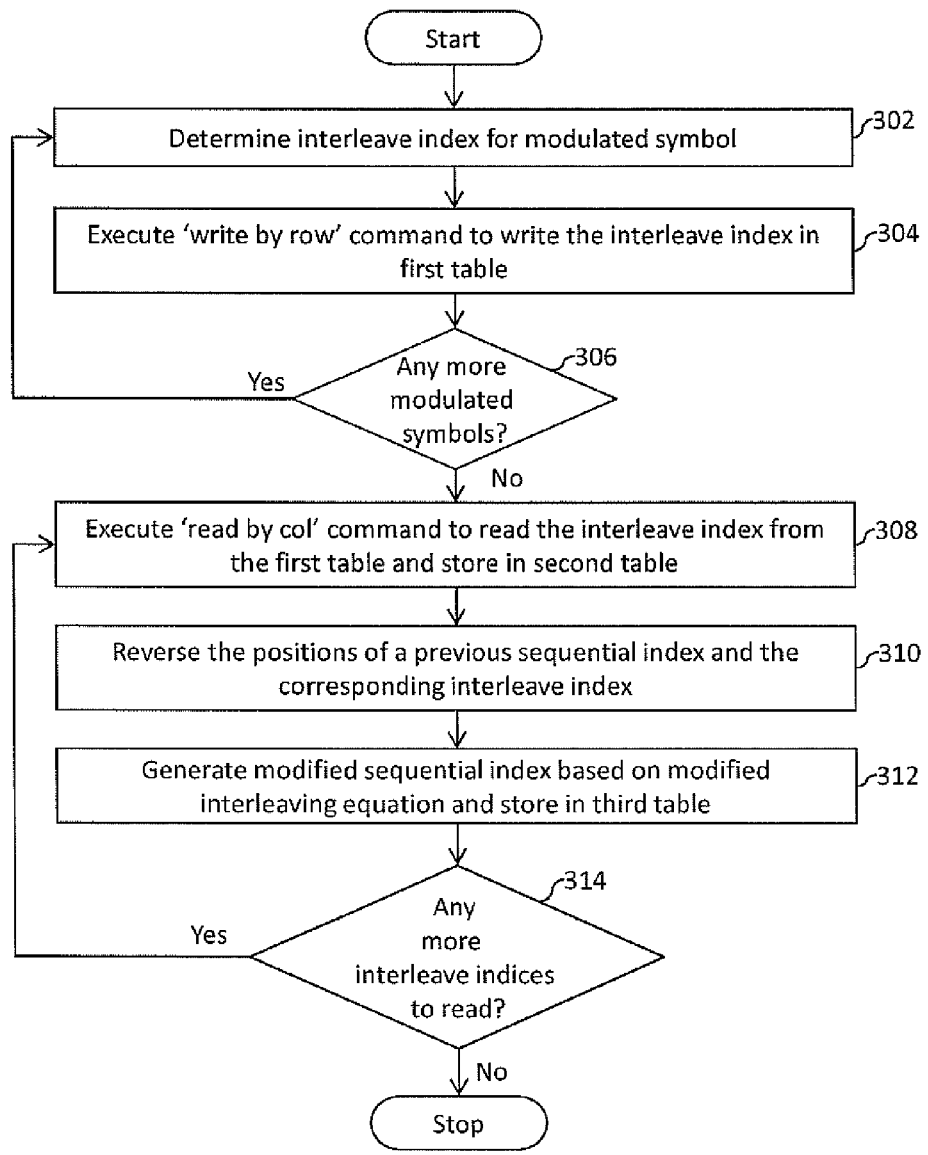
FIG. 3 is a flow chart illustrating a quadruplet interleaving algorithm in accordance with an embodiment of the present invention.
Figure 4:
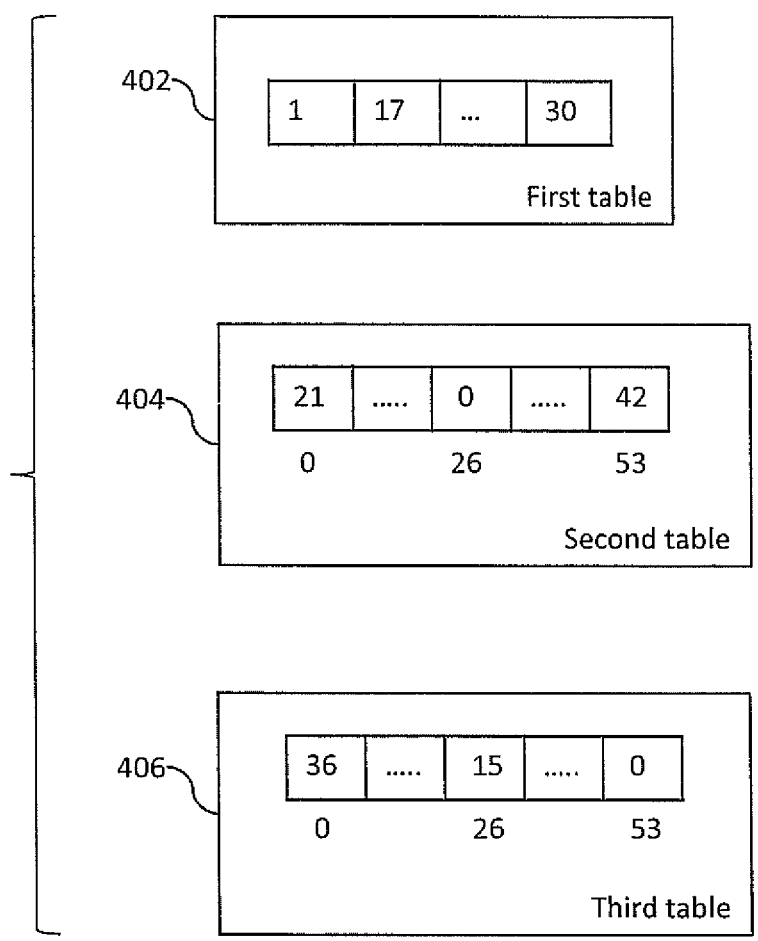
FIG. 4 is a schematic block diagram illustrating first through third tables generated by the quadruplet interleaving algorithm of FIG. 3.

Referring now to FIG. 3, a flow chart illustrating a modified quadruplet interleaving algorithm in accordance with an embodiment of the present invention is shown. The first data processor 104 utilizes the modified quadruplet interleaving algorithm to configure the second lookup table 120. FIG. 3 will be explained in conjunction with FIG. 4, which illustrates first through third tables 402-406 generated by the modified quadruplet interleaving algorithm of FIG. 3.

At step 302, the first data processor 104 determines a mapping location (i.e., an interleave index) of a modulated symbol. At step 304, the first data processor 104 executes a 'write by row' command to write the interleave index in the first table 402 by traversing through rows of the first table 402. At step 306, the first data processor 104 checks to determine if there are any more modulated symbols. If there are more modulated symbols, step 302 is repeated. If there are no more modulated symbols, step 308 is executed. In an example, the first table 402 includes integers 1, 17, and 30 as interleave indices and corresponds to table 5.1.4-2 that is defined in 3GPP Release 8. The table 5.1.4-2 includes an inter-column permutation pattern for a sub-block interleaver.

At step 308, the first data processor 104 executes a 'read by col' command to read and store the interleave index from the first table 402 by traversing through columns of the second table 404. The second table 404 includes a mapping between previous sequential indices and the corresponding interleave indices. At step 310, the first data processor 104 reverses positions of a previous sequential index and the interleave index, thus modifying the second table 404. The second table 404 may include the previous sequential indices 21, 0, and 42 and the corresponding interleave indices 0, 26, and 53.

At step 312, the first data processor 104 generates a modified sequential index based on a modified interleaving equation (1):

$$I\_Cell(i) = (P\_Imp(i) + K)\% \text{ NumQuad} \quad (1)$$

where,

I_Cell (i)=the modified sequential index at an index 'i',

P_Tmp(i)=the previous sequential index at the index 'i',

K=difference between total number of modulated symbols 'NumQuad' and a 'Cell Offset' (i.e., K=NumQuad−Cell Offset), and Cell Offset=modulo value of a Cell ID (an ID of the base station) and the NumQuad (i.e., Cell Offset=Cell ID % NumQuad).

Subsequently, the first data processor 104 stores the modified sequential index in the third table 406. In an example, the third table 406 includes modified sequential indices 36, 15, and 0 and the corresponding interleave indices 0, 26, and 53. At step 314, the first data processor 104 checks to determine if there are any more interleave indices to read. If there are more interleave indices that must be read, step 308 is repeated.

In an example, if NumQuad=57, Cell ID=42, Cell Offset= (42%57)=42, K=15, P_Tmp (i)=42, then I_Cell (i)=(42+15) %57=0. In the example, a first previous sequential index is 42 and a first interleave index of the first modulated symbol is 53. Thus, the first previous sequential index (42) is processed with the modified interleaving equation to generate a first modified sequential index (0). Therefore, the first interleave index (53) associated with the first previous sequential index (42) in the second table 404 is associated with the first modified sequential index (0) in the third table 406. Similarly, the first data processor 104 generates the third table 406 that includes a mapping between the interleave indices and the modified sequential indices. After step 310, the first data processor 104 configures the second lookup table 120 based on the third table 406 to store the mapping between the interleave indices and the corresponding modified sequential indices (also referred to as sequential indices). In an example, the first modulated symbol is a quad symbol (QS) 53. For the first modulated symbol QS53, the first modified sequential index is 0 and the first interleave index is 53. Therefore, the first interleave index (53) corresponds to a location of the first modulated symbol (QS53) and hence, will correspond to the first modified sequential index (0) in the second lookup table 120.

After layer-mapping and pre-coding, the first data processor 104 executes modified interleaving and REG mapping algorithms. The first data processor 104 utilizes the second and third lookup tables 120 and 122 for interleaving and REG mapping the modulated symbols. The first data processor 104 receives the modulated symbols, fetches the sequential indices from the second lookup table 120 based on the control channel element indices and the interleave indices that correspond to the modulated symbols. Next, the first data processor 104 fetches mapping addresses of the REGs from the third lookup table 122 based on the sequential indices and associates the modulated symbols with the corresponding mapping addresses of the REGs. Thus, the modulated symbols are mapped to the resource grid of the transmission frame, thereby mapping the modulated symbols to the REGs.

In the example, the first data processor 104 retrieves the first modulated symbol (QS53) and fetches the first modified sequential index (0) from the second lookup table 120 based on the first control channel element index and the first interleave index (53) that corresponds to the first modulated symbol (QS53). Subsequently, the first data processor 104 fetches a mapping address of the plurality of mapping addresses from the third lookup table 122 based on the first modified sequential index (0). In the example, the first data processor 104 determines the mapping address as 0, and hence, associates the first modulated symbol (QS53) with the REG at address 0.

The first data processor 104 utilizes the control channel element indices to traverse the second lookup table 120. In the example, the first data processor 104 utilizes the second control channel element index to determine a second interleave index. Subsequently, the first data processor 104 utilizes the second interleave index to determine a second modified sequential index, and a mapping address corresponding to the second modified sequential index.

A representation of variables used in the modified interleaving and REG mapping algorithm is shown in Table A. The variables used include the modified sequential index, the interleave index, the previous sequential index, the modulated symbol, and the REG mapping address.

TABLE A

| modified sequential index (I_Cell [i]) | interleave index (i) | previous sequential index (m) | modulated symbol (LM_I[m]) | REG mapping address (M [i]) |
|---|---|---|---|---|
| 36 | 0 | 21 | QS0 | 234 |
| 0 | 53 | 42 | QS53 | 0 |

For example, if the first modulated symbol QS53 is associated with the first interleave index (53), the first data processor 104 retrieves the first modified sequential index (0) based on the first interleave index (53) from the second lookup table 120. A first REG mapping location for the sequential index (53) is 0. Subsequently, the first data processor 104 retrieves the mapping address of the first REG (M [i]) based on the first modified sequential index (53) from the third lookup table 122. Hence, the modulated symbol QS53 is associated with the mapping address M [0], i.e., 0, thus mapping the modulated symbol QS53 to the first REG located at address 0. In the example, the modulated symbol QS53 is mapped on the resource grid.

Subsequently, the first data processor 104 fetches a second byte of the first RDCI payload for further processing. The first data processor 104 further fetches a second byte of the first scrambling code based on an incremented first control channel element index and generates a second byte of the first SDCI payload. Similarly, the first data processor 104 fetches subsequent bytes of the first RDCI payload and the corresponding scrambling codes for generating the first SDCI payload having multiple bytes. When the bytes of the first RDCI payload are exhausted, the first data processor 104 proceeds to fetch bytes of the second. RDCI payload to generate a second SDCI payload and corresponding modulated symbols.

Since the first data processor 104 utilizes the second and third lookup tables 120 and 122 and performs interleaving and REG mapping in a single step, the complexity of the modified interleaving and REG mapping algorithm is reduced and the number of machine cycles required for interleaving and REG mapping is reduced. Further, the first data processor 104 does not require any intermediate buffers for storing and retrieving the modulated symbols, and hence, which further reduces the number of machine cycles required for interleaving and REG mapping. Since the number of machine cycles required for PDCCH processing is reduced, PDCCH processing time is reduced, and hence, multiple users may be supported for each transmission time interval (TTI). Thus, a base station that includes the first data processor 104 can cater to 64 users by providing support for at least 4 users in each TTI.

Subsequent to interleaving and REG mapping, the first data processor 104 generates the transmission frame that includes the mapping of the modulated symbols with the REGs and stores the transmission frame in at least one of first and second antenna buffers (not shown).

The second data processor 108 is connected to the first data processor 104 and the first and second antenna buffers for receiving the transmission frame. The second data processor 108 receives the transmission frame in the frequency domain and converts the transmission frame to the time domain. In one embodiment, the second data processor 108 is a hardware accelerator or a baseband accelerator that includes a fast fourier transform processing engine (FFTPe)

to execute an Inverse Fast Fourier Transform (IFFT) algorithm on the transmission frame. In another embodiment, the second data processor 108 is a cryptographic accelerator, a transmission control protocol (TCP) accelerator, a three-dimension (3D) accelerator, a graphic accelerator, a co-processor, a network interface controller, or a direct memory access (DMA) controller.

The AIC 110 is connected to the second data processor 108 for receiving the transmission frame and generating an RF digital data based on the transmission frame.

The RFIC 112 is connected to the AIC 110 for receiving the RF digital data from the AIC 110, generating the RF signal based on the RF digital data, and transmitting the RF signal by way of the antenna port.

In an embodiment of the present invention, due to the low complexity of the modified interleaving and REG mapping algorithms, the PDCCH processing path is similar to a data processing path utilized for processing of data packets. As a result, the PDCCH processing can be offloaded from the first data processor 104 to the second data processor 108, and hence, the PDCCH processing of the DCI payloads can be implemented in the second data processor 108.

Figure 5:
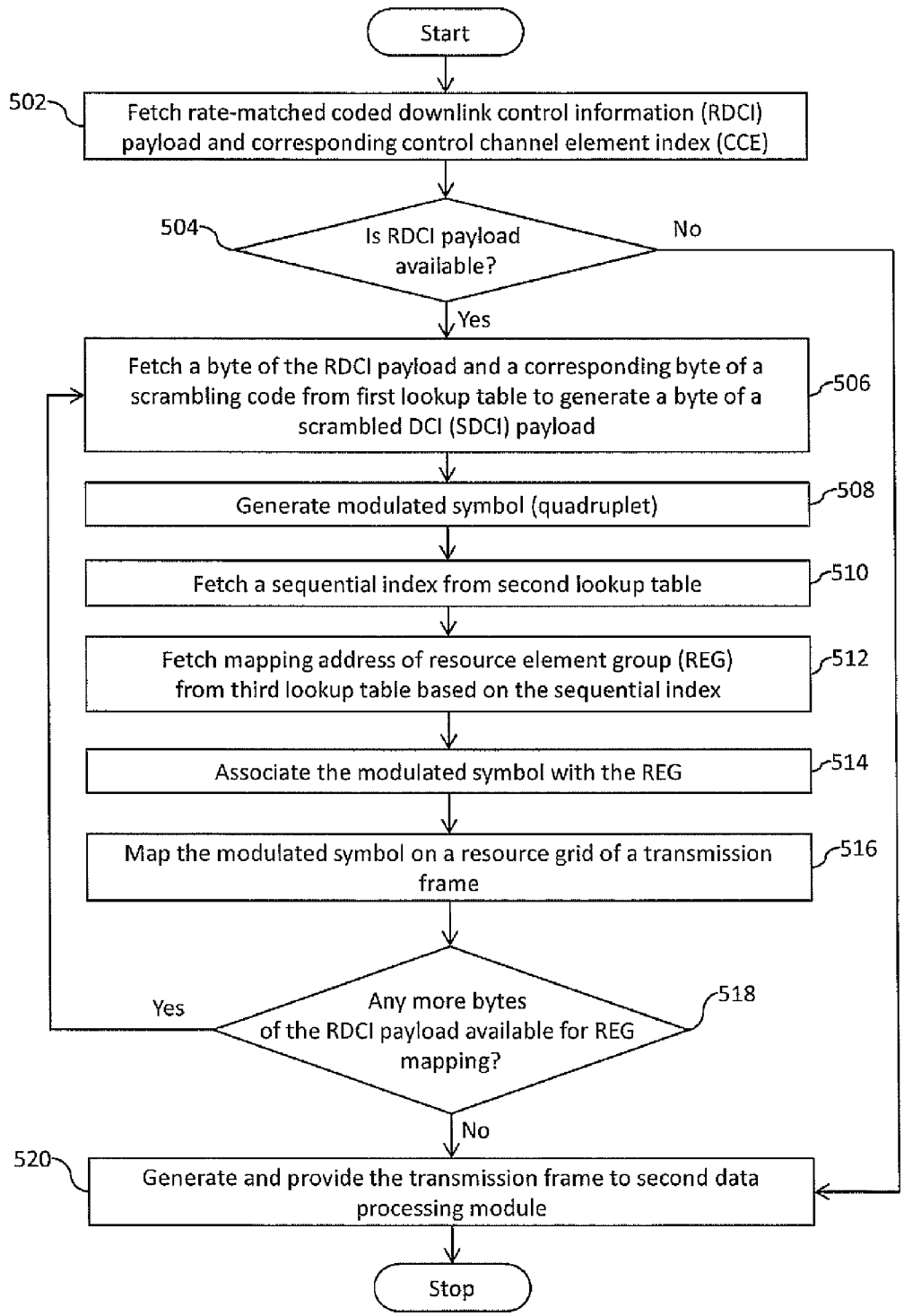
FIG. 5 is a flow chart illustrating a method for generating a transmission frame in accordance with an embodiment of the present invention.

Referring now to FIG. 5, a flow chart illustrating a method for generating a transmission frame in accordance with an embodiment of the present invention is shown. At step 502, the first data processor 104 fetches the RDCI payload and the corresponding control channel element indices (CCEs). At step 504, the first data processor 104 checks to determine if the RDCI payload is available. If at step 504, the first data processor 104 determines that the RDCI payload, is available, then step 506 is executed.

At step 506, the first data processor 104 fetches a byte of the RDCI payload and a byte of a corresponding scrambling code from the first lookup table 118 based on the corresponding CCE. The first data processor 104 scrambles the byte of the RDCI payload with the byte of the corresponding scrambling code and generates a byte of the SDCI payload.

At step 508, the first data processor 104 generates the modulated symbol (quadruplet) by modulating the byte of the SDCI payload. At step 510, the first data processor 104 fetches the sequential index from the second lookup table 120 based on the CCE and the interleave index. At step 512, the first data processor 104 fetches the mapping address of the REG from the third lookup table 122 based on the sequential index. At step 514, the first data processor 104 associates the modulated symbol with the mapping address of the REG, thereby associating the modulated symbol with the REG.

At step 516, the first data processor 104 maps the modulated symbols on the resource grid of the transmission frame. At step 518, the first data processor 104 checks to determine whether any more bytes of the RDCI payload are available for REG mapping. If at step 518, the first data processor 104 determines that more bytes of the RDCI payload are enqueued and hence, available for REG mapping, step 506 is executed. However, if at step 518, the first data processor 104 determines that the bytes of the RDCI payload are not available, step 520 is executed. However, if at step 518, the first data processor 104 determines that all the bytes of the RDCI payload are exhausted and hence, unavailable for REG mapping, step 520 is executed. At step 520, the first data processor 104 generates and provides the transmission frame to the second data processor 108.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system comprising a processor and a memory coupled to the processor, the processor for generating a transmission frame of a radio-frequency (RF) signal for a wireless communication system, wherein the processor is configured to:
   receive downlink control information associated with a transmission channel used for transmitting the RF signal;
   receive a control channel element index associated with the downlink control information;
   determine a scrambling code based on the control channel element index;
   generate a scrambled downlink control information based on the scrambling code;
   modulate the scrambled downlink control information for generating a modulated symbol;
   determine a resource element group (REG) based on the control channel element index;
   map the modulated symbol to the REG for generating the transmission frame;
   store a mapping between a plurality of control channel element indices and a corresponding plurality of scrambling codes in a first lookup table, wherein the plurality of scrambling codes form a scrambling sequence, and wherein the processor fetches the scrambling code from the first lookup table based on the control channel element index;
   store a mapping between a plurality of interleave indices and a corresponding plurality of sequential indices in a second lookup table; and
   store a mapping between the plurality of sequential indices and the corresponding plurality of mapping addresses in a third lookup table, wherein the plurality of interleave indices correspond to a mapping location of a plurality of modulated symbols.

2. The system of claim 1, wherein the transmission frame comprises a plurality of mapping addresses corresponding to a plurality of REGs, and wherein each REG comprises a plurality of resource elements, wherein the plurality of resource elements correspond to at least one of a plurality of subcarriers of the RE signal and a plurality of orthogonal frequency division multiplexing (OFDM) symbols of the RF signal.

3. The system of claim 1, wherein the processor is further configured to:
   fetch a sequential index from the second lookup table based on the control channel element index and fin interleave index that corresponds to the mapping location of the modulated symbol,
   fetch a mapping address from the third lookup table based on the sequential index, wherein the mapping address corresponds to the REG, and associating the modulated symbol with the mapping address, thereby mapping the modulated symbol to the REG.

4. The system of claim 3, wherein each modulated symbol of the plurality of modulated symbols includes a plurality of in-phase and quadrature-phase (I/Q) symbols.

5. The system of claim 1, wherein the processor is further configured to receive a plurality of downlink control information corresponding to a plurality of transmission channels.

6. The system of claim 5, wherein the processor comprises a multicore processor having a plurality of processor cores.

7. The system of claim 6, wherein each processor core:
receives at least one downlink control information of the plurality of downlink control information,
receives at least one control channel element index of a plurality of control channel element indices corresponding to the at least one downlink control information,
generates at least one modulated symbol corresponding to the at least one downlink control information,
maps the at least one modulated symbol to a corresponding REG, and
generates the transmission frame.

8. A wireless communication system, comprising:
a power controller for generating downlink control information associated with a transmission channel used for transmitting a radio-frequency (RF) signal and a control channel element index associated with the downlink control information;
a processor connected to the power controller for receiving the downlink control information and the control channel element index, determining a scrambling code based on the control channel element index, generating a scrambled downlink control information based on the scrambling code, modulating the scrambled downlink control information to generate a modulated symbol, determining a resource element group (REG) based on the control channel element index, mapping the modulated symbol to the REG, and generating a transmission frame;
a hardware accelerator connected to the processor for receiving the transmission frame, and converting the transmission frame from the frequency domain to the time domain;
an antenna interface controller connected to the hardware accelerator for receiving the time domain transmission frame, and generating an RF digital data therefrom;
a radio-frequency integrated circuit (RFIC) connected to the antenna interface controller for receiving the RF digital data, generating the RF signal based on the RF digital data, and transmitting the RF signal by way of an antenna port; and
a memory including:
a first lookup table having a mapping between a plurality of control channel element indices and a corresponding plurality of scrambling codes, wherein the plurality of scrambling codes form a scrambling sequence, and wherein the processor fetches the scrambling code from the first lookup table based on the control channel element index;
a second lookup table that includes a mapping between a plurality of interleave indices and a corresponding plurality of sequential indices, wherein the plurality of interleave indices correspond to a plurality of mapping locations of the modulated symbols; and
a third lookup table that includes a mapping between the plurality of sequential indices and a corresponding plurality of mapping addresses.

9. The wireless communication system of claim 8, wherein the transmission frame comprises a plurality of addresses corresponding to a plurality of REGs, and wherein each REG comprises a plurality of resource elements, and wherein the plurality of resource elements correspond to at least one of a plurality of subcarriers of the RF signal and a plurality of orthogonal frequency division multiplexing (OFDM) symbols of the RF signal.

10. The wireless communication system of claim 8, wherein the processor:
maps the modulated symbol to the REG by fetching a sequential index from the second lookup table based on the control channel element index and an interleave index that corresponds to the mapping location of the modulated symbol,
fetches a mapping address from the third lookup table based on the sequential index, wherein the mapping address corresponds to the REG, and
associates the modulated symbol with the mapping address, thereby mapping the modulated symbol to the REG.

11. The wireless communication system of claim 10, wherein each modulated symbol includes a plurality of in-phase and quadrature-phase (IN) symbols.

12. The wireless communication system of claim 11, wherein the power controller further generates a plurality of downlink control information corresponding to a plurality of transmission channels.

13. The wireless communication system of claim 12, wherein the processor comprises a multicore processor having a plurality of processor cores, wherein each processor core:
receives at least one downlink control information of the plurality of downlink control information,
receives at least one control channel element index of the plurality of control channel element indices corresponding to the at least one downlink control information,
generates at least one modulated symbol corresponding to the at least one downlink control information,
maps the at least one modulated symbol to a corresponding REG of the plurality of resource element groups, and
generates the transmission frame.

14. A method of generating and transmitting a transmission frame of a radio-frequency (RF) signal by a wireless communication system, wherein the wireless communication system includes a hardware accelerator, the method comprising:
receiving downlink control information associated with a transmission channel used for transmitting the RF signal;
receiving a control channel element index associated with the downlink control information;
fetching a scrambling code based on the control channel element index from a first lookup table;
generating scrambled downlink control information using the scrambling code;
modulating the scrambled downlink control information to generate a modulated symbol;
determining a resource element group (REG) based on the control channel element index;
mapping the modulated symbol to the REG to generate the transmission frame;
transmitting the transmission frame by the hardware accelerator;
storing a mapping between a plurality of control channel element indices and a corresponding plurality of scrambling codes in the first lookup table, wherein the plurality of scrambling codes form a scrambling sequence;
storing a mapping between a plurality of interleave indices and a corresponding plurality of sequential indices in a second lookup table; and
storing a mapping between the plurality of sequential indices and a corresponding plurality of mapping addresses in a third lookup table.

15. The method of claim 14, wherein the transmission frame comprises a plurality of addresses corresponding to a plurality of REGs, wherein each REG comprises a plurality of resource elements, and wherein the plurality of resource elements correspond to at least one of a plurality of subcarriers of the RF signal and a plurality of orthogonal frequency division multiplexing (OFDM) symbols of the RF signal.

16. The method of claim 14, further comprising:
fetching a sequential index from the second lookup table based on the control channel element index and an interleave index that corresponds to a mapping location of the modulated symbol;
fetching a mapping address from the third lookup table based on the sequential index, wherein the mapping address corresponds to the REG; and
associating the modulated symbol with the mapping address, thereby mapping the modulated symbol to the REG.

\* \* \* \* \*